United States Patent
Sugimoto et al.

(10) Patent No.: US 9,079,133 B2
(45) Date of Patent: Jul. 14, 2015

(54) AIR-PURIFYING DEVICE FOR VEHICLES

(75) Inventors: Kazuhiro Sugimoto, Susono (JP); Takashi Watanabe, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/983,595

(22) PCT Filed: Feb. 10, 2011

(86) PCT No.: PCT/JP2011/052849
§ 371 (c)(1),
(2), (4) Date: Aug. 5, 2013

(87) PCT Pub. No.: WO2012/108029
PCT Pub. Date: Aug. 16, 2012

(65) Prior Publication Data
US 2013/0312612 A1    Nov. 28, 2013

(51) Int. Cl.
*B01D 53/04* (2006.01)
*B01D 53/66* (2006.01)

(52) U.S. Cl.
CPC ............ *B01D 53/0407* (2013.01); *B01D 53/66* (2013.01); *B01D 2253/102* (2013.01); *B01D 2257/106* (2013.01); *B01D 2258/06* (2013.01); *B01D 2259/4558* (2013.01); *B01D 2259/4566* (2013.01)

(58) Field of Classification Search
CPC .. B01D 46/10; B01D 46/521; B01D 2279/60; A61L 9/16; F02M 35/04; F02M 35/024

USPC .......... 55/385.3, 356; 95/114, 116, 141, 148; 96/143, 146, 228; 423/219, 245.3, 247, 423/239, 244, 210; 422/173, 180; 180/54.1, 180/68.4; 60/274
See application file for complete search history.

(56) References Cited

U.S. PATENT DOCUMENTS

| | | | | |
|---|---|---|---|---|
| 5,968,214 A * | 10/1999 | Nagata et al. | ................. | 55/385.3 |
| 6,212,882 B1 * | 4/2001 | Greger et al. | .................... | 60/274 |
| 6,340,066 B1 * | 1/2002 | Dettling et al. | ............... | 180/54.1 |
| 6,640,794 B2 * | 11/2003 | Weber | ........................... | 123/585 |
| 6,966,293 B1 * | 11/2005 | Patillo | ....................... | 123/198 E |
| 7,749,312 B2 * | 7/2010 | Takigawa et al. | ................. | 96/11 |
| 8,480,798 B1 * | 7/2013 | Myers et al. | .................... | 96/242 |
| 2001/0019707 A1 | 9/2001 | Okayama et al. | | |

(Continued)

FOREIGN PATENT DOCUMENTS

| | | |
|---|---|---|
| CA | 2160425 | 4/1996 |
| DE | 44 40 856 | 5/1996 |

(Continued)

*Primary Examiner* — Duane Smith
*Assistant Examiner* — Minh-Chau Pham
(74) *Attorney, Agent, or Firm* — Finnegan, Henderson, Farabow, Garrett & Dunner, LLP

(57) ABSTRACT

The purpose of the present invention is to provide an air-purifying device for a vehicle that uses an ozone purifier including activated carbon. This air-purifying device for a vehicle, provided by the present invention, includes an ozone purifier which includes activated carbon and being disposed on the surface of an on-vehicle component arranged on a portion where an air flow passage is formed while a vehicle is traveling. The ozone purifier is prepared so that the mean pore size of the activated carbon is preferably 10 nm or less so as to be smaller than the mean particle size of the particulate matter from the vehicle.

5 Claims, 2 Drawing Sheets

(56) References Cited

U.S. PATENT DOCUMENTS

| | | | |
|---|---|---|---|
| 2004/0020359 A1 | 2/2004 | Koermer et al. | |
| 2005/0100492 A1* | 5/2005 | Hoke et al. | 423/219 |
| 2006/0180024 A1 | 8/2006 | Nishida et al. | |
| 2006/0182669 A1 | 8/2006 | Matumura et al. | |
| 2011/0064609 A1* | 3/2011 | Shang et al. | 422/28 |
| 2012/0087853 A1* | 4/2012 | Hui et al. | 423/245.1 |

FOREIGN PATENT DOCUMENTS

| | | |
|---|---|---|
| JP | 8 188041 | 7/1995 |
| JP | 11-507289 | 6/1999 |
| JP | 2001-347829 | 12/2001 |
| JP | 2003-515442 | 5/2003 |
| JP | 2004-321920 | 11/2004 |
| JP | 2005-274181 | 10/2005 |
| JP | 2006-342700 | 12/2006 |
| JP | 2009-82920 | 4/2009 |
| JP | 2010-029816 | 2/2010 |
| WO | WO 96/22150 | 7/1996 |
| WO | WO 01/39886 A1 | 6/2001 |

* cited by examiner

AIR-PURIFYING DEVICE FOR VEHICLES

TECHNICAL FIELD

The present invention relates to an air-purifying device for a vehicle and to an air-purifying device for a vehicle capable of directly purifying ozone in atmospheric air.

BACKGROUND ART

Ozone, which causes photochemical smog, is produced by a photochemical reaction of HC and NOx contained in exhaust gases from automobiles and factories. Therefore, reducing the amount of emissions of HC and NOx from automobiles is an efficient way to suppress the production of ozone and the occurrence of photochemical smog. Also, purifying ozone in the atmospheric air directly can be one of the ways to prevent the occurrence of photochemical smog. By purifying ozone as a product as well as reducing the amount of emissions of HC and NOx as reactants, the occurrence of photochemical smog can be prevented more effectively. In this respect, an automobile including an air-purifying device for a vehicle capable of directly purifying ozone in the atmospheric air has been put into practical use in some places including California in the United States of America. This air-purifying device for a vehicle, particularly, is called a DOR (Direct Ozone Reduction) system.

Previously-used air-purifying device for a vehicle (a DOR system), in which National Publication of International Patent Application No. 2003-515442 represents, is the one that uses metal oxide such as manganese dioxide as a catalyst. By coating a catalyst made of metal oxide on a radiator into which air is delivered during travel of a vehicle, ozone in the atmospheric air is degraded and purified by the catalyst.

It has been known that not only metal oxide catalyst such as manganese dioxide but also activated carbon have a function for purifying ozone. By activated carbon, ozone is converted into carbon dioxide by reaction with activated carbon itself. Since this reaction occurs at ambient temperature, it can be said that activated carbon has an advantage in a purification condition over the metal oxide catalyst which purifies ozone at a higher temperature than the ambient temperature. Moreover, activated carbon has countless fine pores and its surface area per unit volume is quite large. Therefore, it has many chances to contact with ozone in the atmospheric air and thus has high ozone purification performance per unit volume. In addition, the fine pores of the activated carbon have an effect which lowers activation energy for the conversion of ozone to radical oxygen by electron donation from carbon (a capillary condensation effect). With the capillary condensation effect, the degradation of ozone in the fine pores of the activated carbon is accelerated.

However, at present, none of those air-purifying devices for a vehicle with an ozone purifier including the activated carbon have been put into practical use. For there becomes a problem where the activated carbon is used as an ozone purifier, its ozone purifying function is easily deteriorated. The reason for this is particulate matter (hereinafter called "PM" or "PMs") contained in the atmospheric air. Invading PM into the fine pores of the activated carbon results in a clogging, which leads to a significant decrease in substantive surface area of the activated carbon, that is, surface area capable of contacting with ozone. PMs include the ones which are emitted from vehicles such as diesel vehicles and the ones from soil. The clogging of the activated carbon is caused by the former with small particle size. Under an environment with automobiles, naturally, the former level increases. Therefore, in case of applying the activated carbon to the atmospheric air-purifying device for a vehicle, it becomes an issue of how to reduce damage from PMs in the atmospheric air, especially PMs from the vehicle.

CITATION LIST

Patent Literature

Patent Literature 1: National Publication of International Patent Application No, 2003-515442

SUMMARY OF INVENTION

The present invention has been made in view of the above-described issue. The purpose of the invention is to provide an air-purifying device for a vehicle that uses an ozone purifier including activated carbon. An air-purifying device for a vehicle, provided by the present invention, comprises an ozone purifier which is prepared so that the mode pore size of the activated carbon is smaller than the mode particle size of PM from vehicles. This ozone purifier is disposed on the surface of an on-vehicle component arranged on a portion where an air flow passage is formed while a vehicle is traveling. If the mode pore size of the activated carbon is smaller than the mode particle size of PM from vehicles, many PMs are unable to invade into the fine pores of the activated carbon. Thus, the clogging of the activated carbon caused by PM will be suppressed and the activated carbon's purifying function toward ozone will be kept at a high level.

There is a credible data on the particle size of PM from vehicles. The data, which is published by National Institute for Environmental Studies, shows in a graphic representation a relationship between particle size of PM from vehicles and number concentration. According to this data, many of particle sizes of PM from vehicles are distributed within a range from about 0.01 to 0.1 μm and their mode is around 0.05 μm. From this data, it is found that if a pore size of activated carbon is 10 nm or less, most of PMs from vehicles can be prevented from invading into the pore. Therefore, the activated carbon included in the ozone purifier is preferably prepared 10 nm or less in its mode pore size.

A preferable embodiment of the ozone purifier for a vehicle may comprise a PM collector collecting PMs contained in the atmospheric air delivered into the ozone purifier. As the PM collector, activated carbon with larger pore size than the activated carbon included in the ozone purifier may be used. For example, if the mode pore size of the activated carbon included in the ozone purifier is prepared 10 nm or less, then the activated carbon included in the PM collector is prepared so that its mode pore size is 10 nm or more. Since many of particle size of PM from vehicles are distributed within a range from about 0.01 to 0.1 μm, the activated carbon included in the PM collector is preferably prepared so that a distribution range of its pore sizes includes a range from 0.01 to 0.1 μm. By comprising such PM collector with the ozone purifier, the amount of PM delivered into the ozone purifier will be decreased. And the clogging of the activated carbon of the ozone purifier, which is caused by PM, will be able to be suppressed more effectively.

There are two preferable embodiments where the PM collector is provided. In the first embodiment, when an additional on-vehicle component (a second on-vehicle component) is arranged, with respect to said flow passage, on the upstream of the on-vehicle component with the ozone purifier, the PM collector is disposed on the surface of the second on-vehicle component. In this case, it is preferable that the on-vehicle component with the ozone purifier is a radiator. It is preferable that the additional on-vehicle component with the PM collector is a capacitor, a sub-radiator or a bumper grille. On the other hand, in the second embodiment, the PM collector is disposed on the surface of the on-vehicle component by being stacked on the ozone purifier so as to cover the surface of the ozone purifier. In this case, it is preferable that the on-vehicle component is a radiator.

DESCRIPTION OF EMBODIMENTS

First Embodiment

A first embodiment of the present invention will be explained below with reference to Figures.

Figure 1:
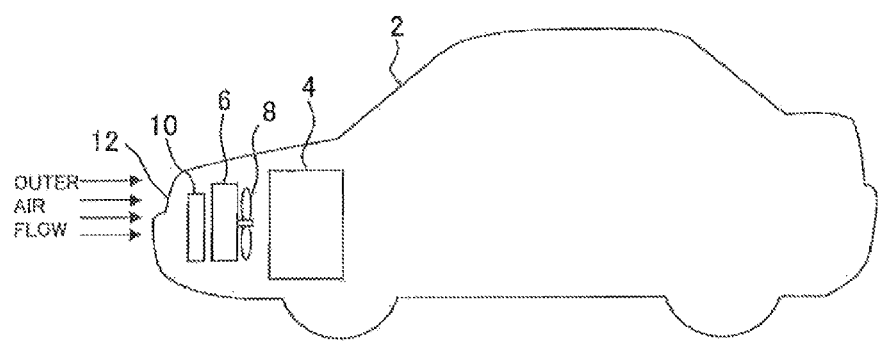
FIG. 1 is a schematic view showing a structure of an automobile on which an air-purifying device for a vehicle according to each embodiment of the present invention is applied.

FIG. 1 is a schematic view showing a structure of an automobile on which an air purifying device for a vehicle according to the embodiment is applied. The air-purifying device for a vehicle is applied on an automobile 2 comprising an internal combustion engine 4 as a power unit. The exhaust gas discharged from the internal combustion engine 4 contains HC and NOx. Ozone is produced by photochemical reaction between HC and NOx as reactants. Therefore, the air-purifying device for a vehicle is applied on the automobile 2 comprising the internal combustion engine 4, the ozone is purified while the automobile 2 is traveling, and thus, the damage to the environment caused due to the automobile 10 can be reduced.

In the automobile 2, a radiator 6 is arranged on the front side of the internal combustion engine 4. A capacitor 10 of an air conditioner is arranged on the front side of the radiator 6. A radiator fan 8 is mounted on the reverse side of the radiator 6. While the automobile 2 is traveling, the atmospheric air is taken in from a bumper grill 12 on a front surface of the automobile 2. The taken air passes through the capacitor 10 and the radiator 6 to be discharged to the rear side. Even while the automobile 2 is stopping, an air flow passage from the bumper grill 12 through the capacitor 10 to the radiator 6 is formed by the revolution of the radiator fan 8.

Figure 2:
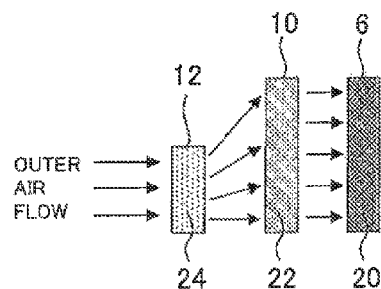
FIG. 2 is a schematic view culled from the automobile 2 shown in FIG. 1 and showing a part especially associated with the air-purifying device for a vehicle in first embodiment of the present invention.

FIG. 2 is a schematic view culled from the automobile 2 and showing a part especially associated with the air-purifying device for a vehicle in the embodiment. In the air-purifying device for a vehicle, with the structure shown in FIG. 2, an ozone purifier 20 including activated carbon is coated on the radiator 6 and PM collectors 22 and 24 are coated on the capacitor 10 and the bumper grill 12 respectively. The ozone purifier 20 may consist of activated carbon only or may include some catalyst materials other than the activated carbon. The PM collectors 22 and 24 include activated carbon in common with the ozone purifier 20. However, there is a clear distinction between the ozone purifier 20 and the PM collectors 22 and 24 in pore size of the activated carbon.

Figure 3:
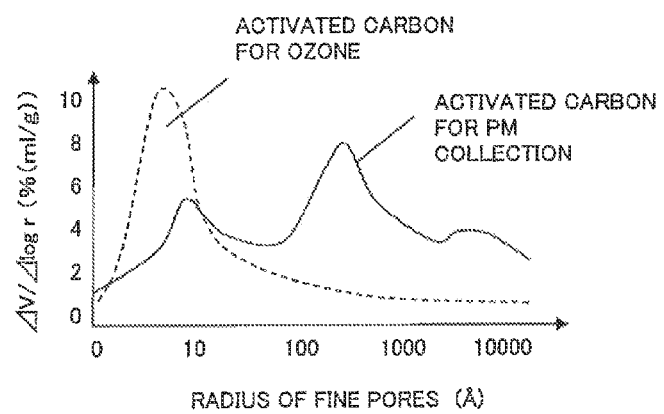
FIG. 3 is a graph showing each distribution in pore size of activated carbon for ozone purification and activated carbon for PM collection.

In the air-purifying device for a vehicle, the activated carbon of the ozone purifier 20 is prepared so that its pore size is 10 nm or less, more practically, so that its mode in number concentration distribution of pore size is 10 nm or less. On the other hand, the activated carbon of the PM collectors 22 and 24 are prepared so that most of their pore sizes are distributed within a range from 10 to 1000 nm. Practically, the activated carbon of the PM collector 24 located in the front with respect to the flow direction of the atmospheric air is prepared so that its pore sizes are distributed within a range from 100 to 1000 nm and the activated carbon of the PM collector 22 located in the rear is prepared so that its pore sizes are distributed within a range from 10 to 100 nm. FIG. 3 is a graph showing an example of each distribution in pore size of the activated carbon of the ozone purifier 20 (activated carbon for ozone purification) and the activated carbon of the PM collectors 22 and 24 (activated carbon for PM collection). The abscissa of the graph shows radius of fine pores and the ordinate shows number concentration of the pores with the radius. In a case shown in this graph, the activated carbon for ozone purification is prepared so that its mode radius of pore is around 1.0 (10 Å) and the activated carbon for PM collection is prepared so that its mode radius of pores are distributed within a wide range from 1.0 to 1000 μm (10 to 10000 Å).

Figure 4:
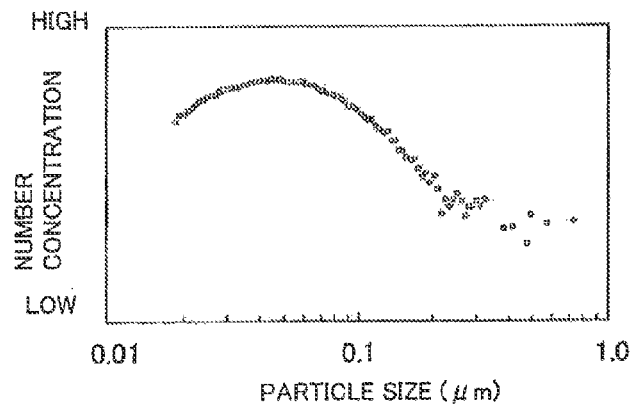
FIG. 4 is a graph showing a relationship between particle size of PM from vehicles and number concentration.

The reason why the difference in pore size of each activated carbon is set in this manner relates to the particle size of the PM from vehicles. FIG. 4 is a graph showing a relationship between particle size of PM from vehicles and number concentration published by National Institute for Environmental Studies. As shown in this graph, many of particle sizes of PM from vehicles are distributed within a range from about 0.01 to 0.1 μm (about 10 to 100 nm) and their mode is around 0.05 μm (50 nm). Therefore, if the mode pore size of the activated carbon is prepared 10 nm or less, most of PMs from vehicles can be prevented from invading into the fine pores and the clogging of the activated carbon can be suppressed. On the other hand, if the distribution of size of the activated carbon is prepared so as to include a range from 10 to 100 nm, then PMs from vehicles in the atmospheric air can be collected effectively.

Figure 5:
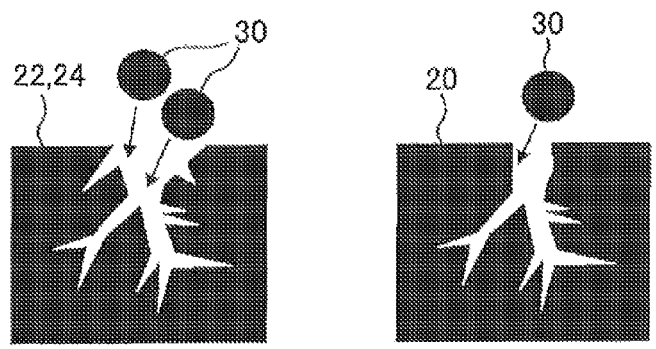
FIG. 5 is a schematic view showing a relationship between pore size of activated carbon and ease of invading PM into fine pores.

FIG. 5 is a schematic view showing a relationship between pore size of activated carbon and ease of invading PM into fine pores. In case of the activated carbon of the PM collector 22 or 24, since the distribution of its pore size is prepared so as to include the distribution range of the particle size of PM, PM 30 is susceptible to invade into the fine pores shown in the left side of FIG. 5. On the other hand, in case of the activated carbon of the ozone purifier 20, since its pore size is prepared so as to be smaller than the particle size of PM, PM 30 is difficult to invade into the fine pores shown in the right side of FIG. 5. That is, the pore size of the activated carbon of the PM collector 22 or 24 is prepared so as to let PMs invade into the fine pores and enable to collect PMs, while the pore size of the activated carbon of the ozone purifier 20 is prepared so as to prevent PMs into the fine pores and enable to suppress the clogging.

As described above, according to the air-purifying device for a vehicle, since the activated carbon of the ozone purifier 20 coated on the radiator 6 is prepared so that its mode pore size is 10 nm or less, the clogging of the activated carbon caused by PM can be suppressed and the activated carbon's purifying function toward ozone can be kept at a high level. Moreover, according to the air-purifying device for a vehicle, PM with 100 nm or more particle size can be collected by the PM collector 24 coated on the bumper grill 12 and PM with 10 nm or more particle size can be collected by the PM collector 22 coated on the capacitor 10. As a result of this, it becomes possible to decrease the amount of PM delivered into the ozone purifier 20 located in the rear of the PM collector 22 and 24 and to suppress the clogging of the activated carbon caused by PM more effectively. There is no limit how to adjust the pore size of the activated carbon.

Second Embodiment

Subsequently, a second embodiment of the present invention will be explained below with reference to Figures.

Figure 6:
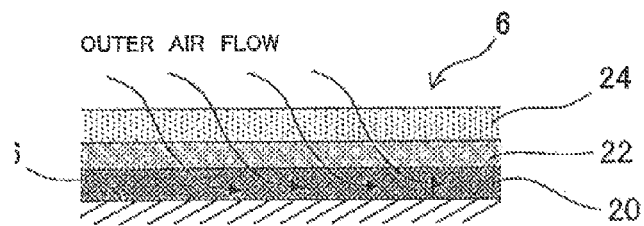
FIG. 6 is a schematic view culled from the automobile 2 shown in FIG. 1 and showing a part especially associated with the air-purifying device for a vehicle in second embodiment of the present invention.

FIG. 6 is a schematic view culled from the automobile 2 and showing a part especially associated with the air-purifying device for a vehicle in the embodiment. As shown in FIG. 6, in the air-purifying device for a vehicle, the ozone purifier 20 is coated on the surface of fins 16 of the radiator 6, on which the PM collector 22 and 24 are additionally coated by two layers. The pore size of the activated carbon included in the ozone purifier 20 is prepared as explained in the first embodiment. The pore size of the activated carbon included in the PM collector 22 and 24 are also prepared as explained in the first embodiment.

According to the air-purifying device for a vehicle, the atmospheric air delivered into the radiator 6 firstly passes through the PM collector 24 which is prepared so that pore size of the activated carbon are distributed within a range from 100 to 1000 nm and then flows into the underlying PM collector 22. In this process, PM with 100 nm or more particle size are collected by the PM collector 24 and removed from the atmospheric air. Since the underlying PM collector 22 is prepared so that pore size of the activated carbon are distributed within a range from 10 to 100 nm, PM with 10 nm or more particle size contained in the atmospheric air are collected while passing through the PM collector 22. In this way, PM with 10 nm or more particle size contained in the atmospheric air, that is, most of PMs are removed from the atmospheric air before flowing into the ozone purifier 20. Since the bottom ozone purifier 20 is prepared so that its pore size of the activated carbon is 10 nm or less, if PMs are remained in the atmospheric air, the clogging of the activated carbon by the remained PMs will be suppressed. Therefore, according to the air-purifying device for a vehicle, as in the first embodiment, the activated carbon's purifying function toward ozone can be kept at a high level.

Other

While the present invention has been described in terms of the embodiments, it is not limited to the embodiments, but extends to various modifications that nevertheless fall within the scope of the appended claims. For example, only the ozone purifier 20 may be applied on the vehicle without the PM collector 22 or 24.

Moreover, the PM collector is coated on the capacitor in the first embodiment. However if the vehicle comprises a sub-radiator, the PM collector may be coated on the sub-radiator.

The PM collector may be coated on at least the bumper grill, the capacitor and the sub-radiator rather than the first embodiment where the PM collectors with differential pore size are arranged back and forth.

Moreover, the PM collectors with differential pore size are coated by two layers in the second embodiment. However, the PM collectors may be formed by one layer. Moreover, it is not limited to the radiator over which the ozone purifier and the PM collectors are recoated. The ozone purifier and the PM collectors may be additionally coated on the bumper grill, the capacitor and the sub-radiator.

DESCRIPTION OF REFERENCE NUMERALS

2 automobile
4 internal combustion engine
6 radiator
8 radiator fan
10 capacitor
12 bumper grill
16 radiator fin
20 ozone purifier
22, 24 PM collector
30 PM

The invention claimed is:

1. An air-purifying device for a vehicle, comprising:
an on-vehicle component arranged on a portion where an air flow passage is formed while the vehicle is traveling; and
an ozone purifier which includes activated carbon while being disposed on the surface of said on-vehicle component, wherein
said ozone purifier is prepared so that the mode pore size of the activated carbon is 10 nm or less, and
the air-purifying device further comprises a PM collector which includes activated carbon with larger pore size than that of the activated carbon included in said ozone purifier so as to collect PMs contained in atmospheric air flowing into said ozone purifier,
wherein the activated carbon included in said PM collector is prepared so that a distribution range of its pore sizes includes a range from 10 to 100 nm.

2. The air-purifying device for a vehicle according to claim 1, wherein
said PM collector is disposed on a second on-vehicle component arranged on the upstream of said on-vehicle component in said flow passage.

3. The air-purifying device for a vehicle according to claim 2, wherein
said on-vehicle component is a radiator, and
said second on-vehicle component is a capacitor, a sub-radiator or a bumper grille.

4. The air-purifying device for a vehicle according to claim 1, wherein
said PM collector is disposed on the surface of said on-vehicle component by being stacked on said ozone purifier so as to cover the surface of said ozone purifier.

5. The air-purifying device for a vehicle according to claim 4, wherein
said on-vehicle component is a radiator.

* * * * *